US012501101B1

(12) United States Patent
Arling et al.

(10) Patent No.: US 12,501,101 B1
(45) Date of Patent: Dec. 16, 2025

(54) CONTROLLING DEVICE CONFIGURABLE TO ENABLE SELECTION OF ONE OR MORE SERVICES

(71) Applicant: Universal Electronics Inc., Scottsdale, AZ (US)

(72) Inventors: Paul D. Arling, Scottsdale, AZ (US); Kurt R. Thielen, Maple Grove, MN (US); Kuldip Singh Johal, Wokingham (GB)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

(21) Appl. No.: 18/824,329

(22) Filed: Sep. 4, 2024

(51) Int. Cl.
*H04N 21/422* (2011.01)

(52) U.S. Cl.
CPC .............................. *H04N 21/42227* (2013.01)

(58) Field of Classification Search
CPC ................................................ H04N 21/42227
See application file for complete search history.

(56) References Cited

U.S. PATENT DOCUMENTS

| 4,959,810 | A | 9/1990 | Darbee |
| 5,414,426 | A | 5/1995 | O'Donnell |
| 5,481,256 | A | 1/1996 | Darbee |
| 5,614,906 | A | 3/1997 | Hayes |
| 5,959,751 | A | 9/1999 | Darbee |
| 6,014,092 | A | 1/2000 | Darbee |
| 6,225,938 | B1 | 5/2001 | Hayes |
| 7,193,661 | B2 | 3/2007 | Dresti |
| 9,135,811 | B2 | 9/2015 | Arling |
| 9,736,523 | B2 | 8/2017 | Black |
| 11,169,831 | B1* | 11/2021 | Semenov ............ G06F 3/04886 |
| 11,234,040 | B1* | 1/2022 | Nijim ................... H04N 21/251 |
| 11,678,002 | B1 | 6/2023 | Koopmans |
| 2014/0098301 | A1* | 4/2014 | Hara .................. H04N 21/4131 348/734 |

OTHER PUBLICATIONS

International Search Report and Written Opinion of application No. PCT/US2025/044893, dated Oct. 17, 2025, 6 pp.

* cited by examiner

*Primary Examiner* — Michael E Teitelbaum
(74) *Attorney, Agent, or Firm* — Greenberg Traurig, LLP

(57) ABSTRACT

A remote control is configured by using a service access history associated with at least a one of the remote control and a controllable appliance to determine a first service accessible via use of the controllable appliance that is to be associated with the programmable key and by transmitting to the remote control data for use by the remote control in configuring the remote control such that activation of the programmable key will cause the remote control to transmit a command to the controllable appliance to cause the controllable appliance to access the first service and for causing a display of an indicator for the first service in a display of the controlling device that is associated with the programmable key.

13 Claims, 10 Drawing Sheets

CONTROLLING DEVICE CONFIGURABLE TO ENABLE SELECTION OF ONE OR MORE SERVICES

BACKGROUND

Controlling devices of various types are known in the art. Universal type controlling devices are adaptable to issue commands to a multiplicity of appliances of different manufacture and/or type. Unified type controlling devices are made to issue commands to a multiplicity of types of appliances of the same manufacture. Dedicated type controlling devices are made to issue commands to a specific device of specific type and manufacture. In some instances, a remote control may be a combination type remote control. For example, a remote control dedicated to controlling a set-top box of a given make/model that is provided to a homeowner by a given cable or satellite service provider, such as "COMCAST, "DIRECT TV," or the like, may also be programmable to control a television of multiple different manufacturers/brands.

A popular feature of controlling devices of all types is the ability to configure or program certain keys of the controlling device to enable rapid access to a user's favorite content, e.g., a TV channel, a radio station, etc. To this end, various methods of configuring a controlling device to perform such functions have been proposed. For example U.S. Pat. No. 5,414,426 describes a user-programmable, favorite channel macro key, U.S. Pat. No. 7,193,661 describes a system in which channel data may be downloaded from a set-top box into a controlling device for future use in favorite channel selection, and U.S. Pat. No. 9,135,811 describes a yet further method for acquiring favorite channel information from a set-top box.

By way of further example, U.S. Pat. No. 9,736,523 describes a system and method for convenient configuration of certain controlling device keys to provide direct access to media streams originating from user selected or system selected media content providers. To this end, a controlling device may be provisioned with a group of keys each adapted to receive an individual overlay, such as a sticker from a sheet of stickers provided in conjunction with the controlling device. Each overlay is imprinted with a visual indicium representative of a media content provider, for example a TV broadcast channel logo, and further comprises encoded machine-readable information in the form of an RFID tag or a conductive pattern on the underside of the overlay. The machine-readable information, when read by the controlling device, serves to identify the desired media content provider to the controlling device upon placement of the overlay to a key and the identity is used to assign channel tuning commands to the key upon which the overlay was placed.

Still further, U.S. Pat. No. 11,678,002 describes a controlling device provisioned with a group of keys each adapted to receive an individual tag, insert, sticker, overlay, or the like (individually and collectively referred to hereinafter as an "insert"). Each insert may be imprinted with visual indicium representative of a media content provider, for example a TV network name and/or logo. Each insert may also be imprinted with information that is representative of a cable or satellite service provider. The service provider information may be in the form of a logo, a color coding applied to the insert, etc. When one or more inserts are provided to one or more of the group of keys, an image capturing device may be used to obtain an image of the insert/key combinations and the image may be analyzed by an image recognition service using image processing techniques to determine which media content providers were associated with which keys. The association is then used to assign one or more commands, such as channel tuning commands, an app invocation command, etc., to each of the keys such that an activation of a one of the keys will cause a target device to tune to/access a media stream being provided by the media content provider that corresponds to the insert that was associated with the activated key. If needed, the service provider information may also be used to determine the commands that are to be assigned to one or more of the keys, for example by using a channel listing that is associated with the service provider in the geographic region in which the controlling device is to be used.

SUMMARY

The following generally describes systems and methods for configuration of a controlling device having a display whereby, when configured, the controlling device will provide access to one or more media streams, apps, content providers, or the like, individually and collectively referred to herein as a service.

More particularly, the following describes a system and method whereby a remote control is configured by using a service access history associated with at least a one of the remote control and a controllable appliance to determine a first service accessible via use of the controllable appliance that is to be associated with the programmable key and by transmitting to the remote control data for use by the remote control in configuring the remote control such that activation of the programmable key will cause the remote control to transmit a command to the controllable appliance to cause the controllable appliance to access the first service and for causing a display of an indicator for the first service in a display of the controlling device that is associated with the programmable key.

A better understanding of the objects, advantages, features, properties and relationships of the subject systems and methods will be obtained from the following detailed description and accompanying drawings which set forth illustrative embodiments and which are indicative of the various ways in which the principles of the invention hereinafter claimed may be employed.

BRIEF DESCRIPTION OF THE DRAWINGS

For a better understanding of the various aspects of the subject systems and methods, reference may be had to preferred embodiments shown in the attached drawings in which.

DETAILED DESCRIPTION

Figure 1:
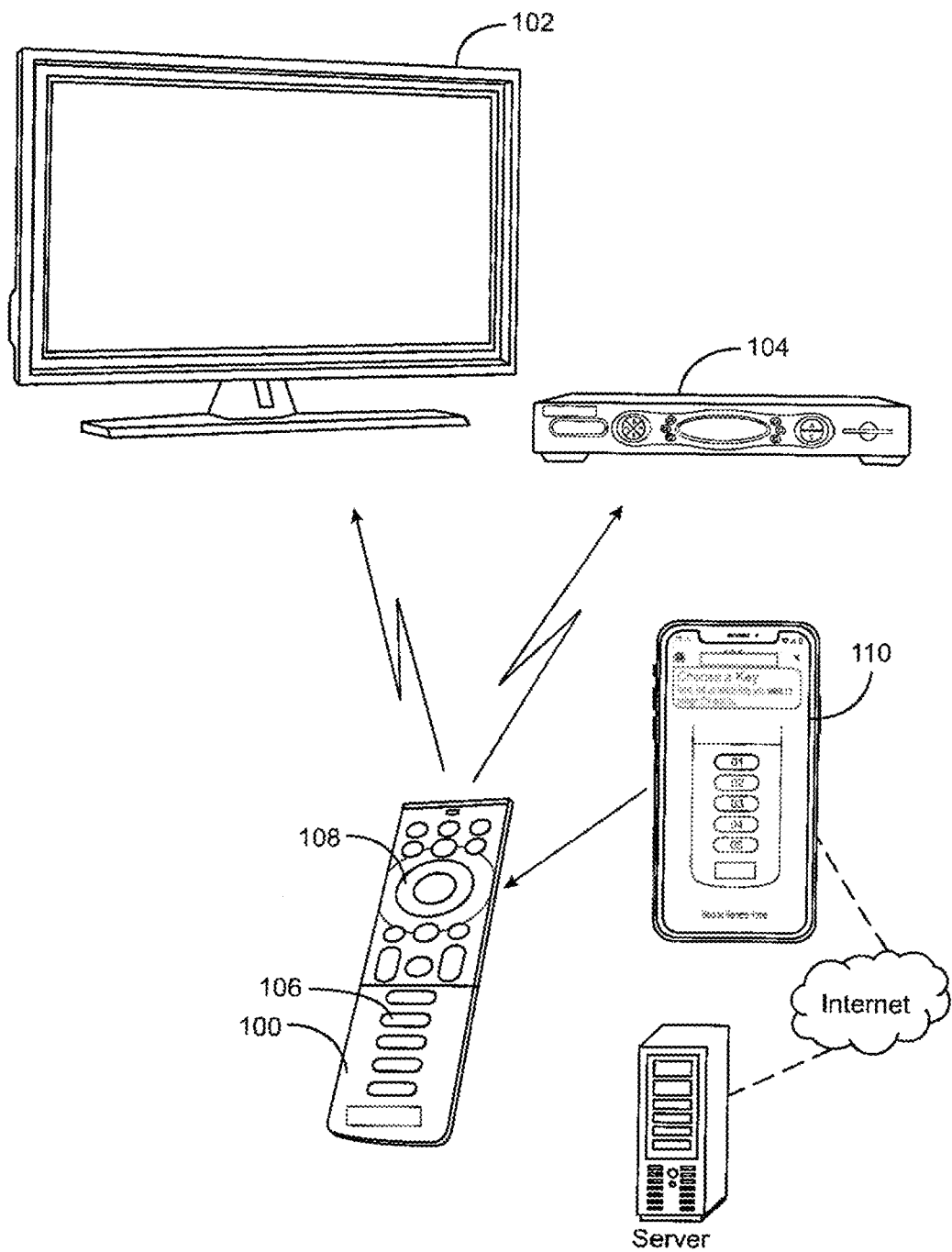
FIG. 1 illustrates an example system in which an example controlling device according to the description that follows may be used.

FIG. 1 illustrates an example system in which a controlling device 100 is configured to control various controllable appliances, such as a television ("TV") 102 and a set-top box ("STB") 104. While the universal type controlling device presented in the example system is representative of the broadest applicability of the systems and methods herein described, it will be appreciated that these descriptions may be equally applied to unified, dedicated, or combination type controlling devices as desired.

As is known in the art, the controlling device 100 is capable of transmitting commands to target controllable appliances, using any convenient IR, RF, Point-to-Point, or networked protocol, to cause the appliances to perform operational functions. While illustrated in the context of a TV 102 and STB 104, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

As further illustrated in FIG. 1, a smart device 110, such as a smart phone, a tablet computing device, a computer, or the like, supporting a controlling device configuration app or the like type of programming provides a means for configuring (also referred to as programming) one or more programmable, media access keys 106 of the controlling device 100. As will be described hereinafter, each of the media access keys 106 may be programmed such that, upon an activation of a one of the media access keys 106, one or more commands will be issued to a target controllable appliance, such as STB 104, for the purpose of causing the target controllable appliance to tune to/access a media stream that originates from a media content provider that has been associated with the media access key 106 so activated. While not required, the controlling device configuration app of the smart device 110 may also be used to configure, i.e., map to intended target controllable appliance(s), the remaining function keys 108 of the controlling device 100, such as the volume keys, the navigation keys, etc., as known in the art.

For conveying to the controlling device 100 the data that is to be used to configure a media access key 106 of the controlling device 100, where the data, such as a pointer to one or more command codes in a command code set stored in a memory of the controlling device 100, a sequence of command codes themselves, etc., is caused to be generated by the configuration app executing on the smart device 110, the smart device 110 and the controlling device 100 may be adapted to communicate directly, for example, via use of a "BLUETOOTH" connection. Alternatively or additionally, the controlling device 100 and the smart device 110 may be adapted to communicate indirectly, for example, via use of a local area network or via use of a wide area network, such as the Internet. Yet further, the configuration app executing on the smart device 110 may provide data to a cloud server and the cloud server may use the data provided by the smart device 110 to generate the data that is to be provided to the controlling device 100 for the purpose of configuring a media access key 106 of the controlling device 100. Still further, generated configuration information may be provided to the controlling device 100 via use of a memory stick or the like without any limitation.

Figure 2:
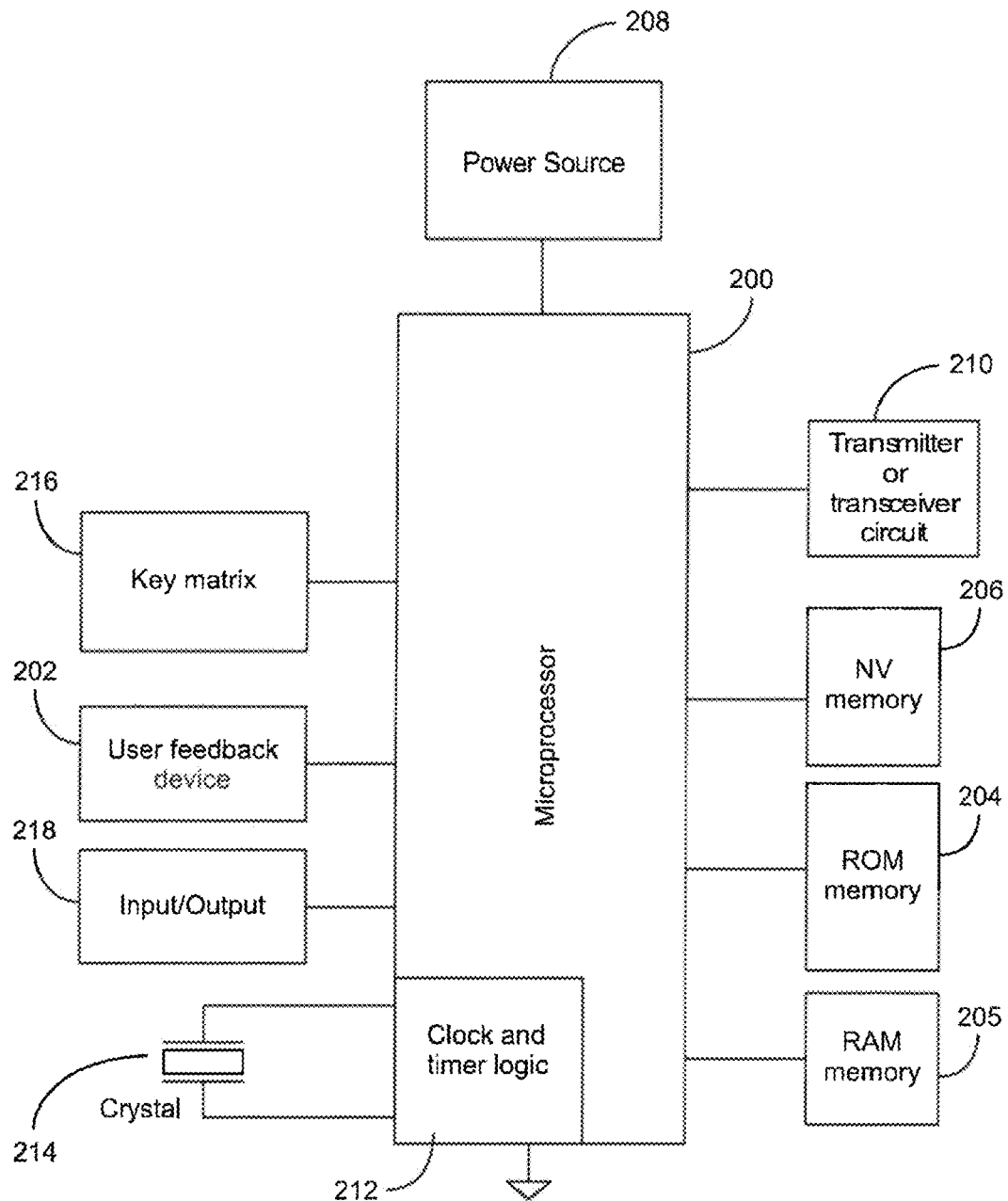
FIG. 2 illustrates a block diagram of example components of the example controlling device of FIG. 1.

With reference to FIG. 2, for use in commanding the functional operations of one or more appliances, such as TV 102 and/or STB 104, the controlling device 100 may include, as needed for a particular application, a processor 200 coupled to a ROM memory 204, a RAM memory 205, a key matrix 216 (including the hard keys 106 and function keys 108 implemented as hard keys and/or soft keys provided via use of a touch sensitive surface overlaid on a liquid crystal (LCD), an electroluminescent (EL) display, etc.), transmission circuit(s) and/or transceiver circuit(s) 210 (e.g., IR and/or RF), a non-volatile read/write memory 206, a means 202 to provide feedback to the user (e.g., one or more LEDs, display, speaker, and/or the like), a power source 208, an input/output port 218 such as a serial interface, USB port, modem, Zigbee, WiFi, or Bluetooth transceiver, etc., and clock and timer logic 212 with associated crystal or resonator 214.

As will be understood by those skilled in the art, some or all of the memories 204, 205, 206 may include executable instructions (collectively, the program memory) that are intended to be executed by the processor 200 to control the operation of the controlling device 100, as well as data which serves to define to the operational software the necessary control protocols and command values for use in transmitting command signals to controllable appliances (collectively, the command data). In this manner, the processor 200 may be programmed to control the various electronic components within the remote control 100, e.g., to monitor the power supply 208, to cause the transmission of signals, etc. The non-volatile read/write memory 206, for example an EEPROM, battery-backed up RAM, FLASH, Smart Card, memory stick, or the like, may additionally be provided to store setup data and parameters as necessary. While the memory 204 is illustrated and described as a ROM memory, memory 204 can also be comprised of any type of readable media, such as ROM, FLASH, EEPROM, or the like. Preferably, the memories 204 and 205 are non-volatile or battery-backed such that data is not required to be reloaded after battery changes. In addition, the memories 204, 205 and 206 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 204 and 206 respectively), and/or may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 is adapted to be responsive to events, such as a sensed user interaction with the key matrix 216, receipt of configuration data, etc. In response to an event, appropriate instructions within the program memory (hereafter the "operating program") may be executed. For example, when a function key is actuated on the controlling device 100, the controlling device 100 may retrieve from the command data stored in memory 204, 205, 206 a command value and control protocol corresponding to the actuated function key and, where necessary, current device mode of the controlling device and transmit that command to an intended target appliance, e.g., STB 104, in a format recognizable by that appliance to thereby control one or more functional operations of that appliance. It will be appreciated that the operating program can be used not only to cause the transmission of commands/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092.

For selecting one or more sets of command data to be associated with the appliances to be controlled, e.g., in instances where the controlling device has universal type capabilities, data may be provided to the controlling device 100 that serves to identify each intended target appliance by its make, and/or model, and/or type. The data is typically entered via activation of those keys that are also used to cause the transmission of commands to an appliance, preferably the keys that are labeled with numerals. In other instances, keys which are normally assigned to other command functions may temporarily represent numeric values during entry of such appliance identification data. Still further, the data may be obtained via use of the configuration app installed on the smart device 110 with appropriate configuration data then being conveyed to the controlling device 100. Yet further, the data may be obtained directly from the device to be controlled. Regardless of how such data is obtained by the controlling device 100, the data allows the controlling device 100 to identify the appropriate command data set, within a preprogrammed library of command data sets stored in the memory of the controlling device 100, that is to be used to transmit recognizable commands in formats appropriate for such identified appliances. The library of command data sets may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In conventional practice and as is well known in the art, such data used to identify an appropriate command data set may take the form of a numeric setup code (obtained, for example, from a printed list of manufacturer names and/or models with corresponding code numbers, from a support Web site, etc.). Alternative setup procedures previously proposed in the art include scanning a bar code or an electronic product code (EPC), sequentially transmitting a predetermined command in different formats until a target appliance response is detected, interaction with a Web site culminating in downloading of command data and/or setup codes to the controlling device, using an interactive service to identify the device type, brand, and model, etc. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959,810, 5,614,906, or 6,225,938 all of like assignee and incorporated herein by reference in their entirety. It will be also understood that, rather than provide an indicator of a command code set to use, the remote control 10 may be provided with a command code set itself, in whole or in part.

It will also be understood that the smart device 110 includes similar elements as needed to support at least the configuration app and as needed to allow data to be provided to the controlling device 100 and/or to a cloud server for at least the purpose of configuring the media access keys 106 of the controlling device 100.

Turning now to FIGS. 3A-3E, an example method for facilitating rapid and convenient setup of a media access key 106 is illustrated. In this example, a token 300 is provided to the user and the token 300 includes a QR code 302 and, optionally, one or more inserts 304 that are to be attached to a programmable, media access key 106 of the controlling device 100. As shown in FIGS. 5E and 4, the insert 304 is to be attached to a programmed media access key 106 to provide a user with a reference as to what media content provider will be accessed when the media access key 106 is activated. The insert 304 may be in the form of a sticker, a tag, an overlay, or in any other form as desired. When the insert 304 is not self-adhering, it will be appreciated that the media access key 106 will be provided with elements for maintaining the insert in place, such as a sleeve, lips for allowing the insert 304 to be snap-fit into place on the key 106, or the like. As additionally shown in FIG. 4, the insert 304 is preferably separable from the media access key 106 to allow the insert 304 to be replaced as needed.

Figure 3B:
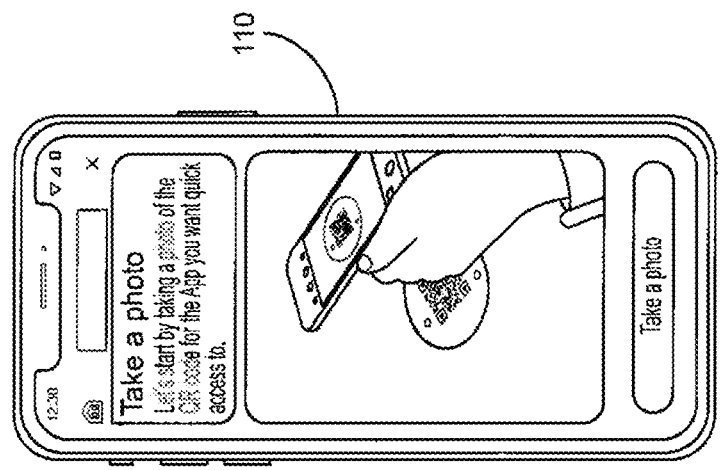
FIGS. 3A-3E illustrates example steps for configuring a configurable key of the example controlling device with one or more commands for accessing a media content provider.
Figure 3A:
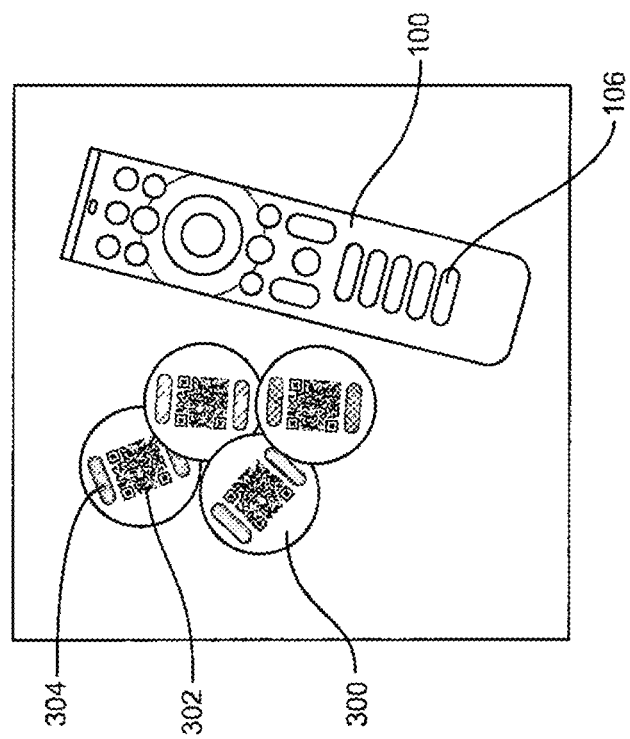
Figure 4:
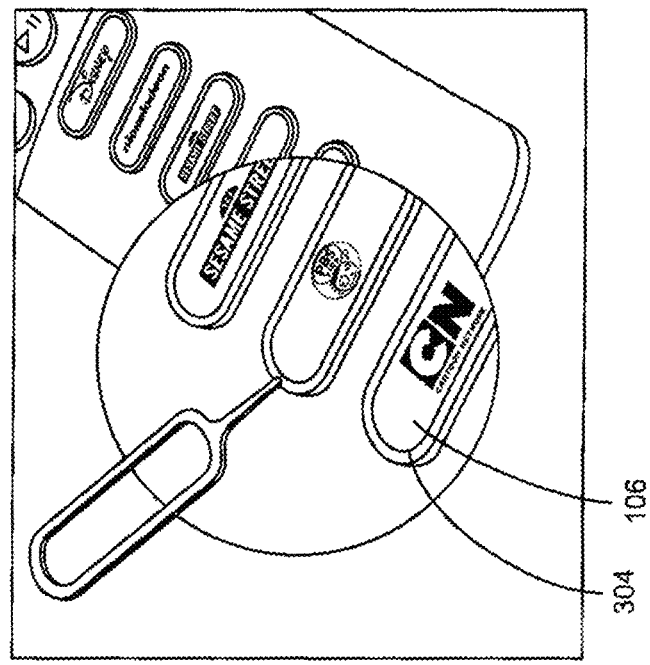
FIG. 4 illustrates an example insert having a media content provider indicium removable attached to a configurable key of the example controlling device.
Figure 3E:
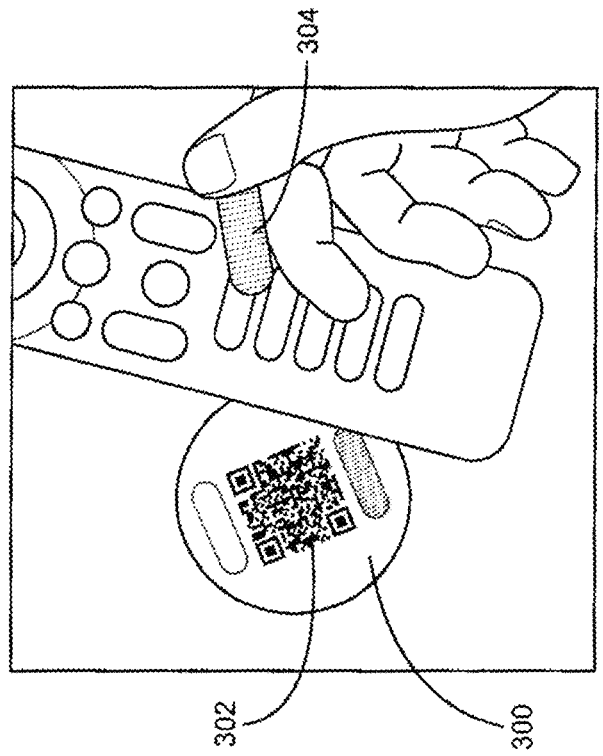

To program a media access key 106, a configuration app is invoked on the smart device 110 as shown in FIG. 3B and the configuration app instructs a user to use a camera associated with the smart device 110 to scan the QR code 302 of the token 300. The QR code 302 in this example has data that will function to specify a media content provider, such as "PBS," "ESPN," "Disney+," or the like. In this regard, those of skill in the art will understand that a scanned QR code will be provided to a QR decoder (either local to the smart device 110 or otherwise associated with a cloud-based server) and the QR decoder will extract from the data encoded within the QR code the data indicative of at least a media content provider. As needed, the QR code may also specify a service provider (e.g., over the air, cable, satellite, or Internet) by which the media content service is to be accessed. The configuration app (or a cloud service associated with the configuration app) will then use the data that indicates the media content provider, data that indicates a service provider (such as "COMCAST," "DIRECT TV," etc.) as needed, and data that indicates a geographic location in which the remote control is to be used as needed, to determine the one or more commands, and possibly protocol, to be used to cause a controllable device, such as STB 104, to access a media originating from the media content provider. As noted above, the commands may be commands that specify a channel that a device is to tune to, may be an app invocation call, or the like without limitation. In some instances, the one or more commands will cause a target device to simply access or tune to the channel on which the media content provider is being broadcast while, in other instances, the one or more commands derived from the QR code data may direct the user to a particular media stream that originates from a media content provider, such as a single movie.

To determine the one or more commands that are to be used to access the media content provider, e.g., the channel on which the media content provider is being broadcast, the app associated with the media content provider, the internet website associated with the media content provider, etc., the configuration app (or an associated cloud-based service) may use a channel lineup which specifies, for a given service provider in a given geographic location, the channel on which a media source provider is being broadcast, a DNS, or any other like directory that serves to locate and provide an address for accessing a media content provider. For example, if the system scans a QR code 302 provided with an "ESPN" access token, the system may determine that, "ESPN" is being broadcast on channel 270 on "COMCAST" in Phoenix, Arizona and may then cause the one or more commands for causing a "COMCAST" supplied STB to tune to channel 270 to be assigned to a one of the programmable media access keys 106 as further described below. As noted above, that the service provider is "COMCAST" could be specified to the system in the QR code itself, could be inferred from prior programming of the controlling device 100 (e.g., the controlling device was previously programmed to control a "COMCAST" STB), could be determined based on a shape, color, key layout, and/or the like of the remote control to be programed when captured by the camera of the smart device 110 (in the event service providers are provided with uniquely identifiable remotes), etc. Service provider information could also be inferred from a knowledge of device(s) within the environment (e.g., when no STB is present it can be determined that "ESPN" would only be accessible via use of an app installed on the smart TV and, therefore, the selected one or more commands should be an "ESPN" app invocation call directed to the TV; when no smart device is present in the system it can be determined that the STB is the only device providing access to the service, etc.). Service provider information could also be required to be manually indicated to the configuration app by the user or could be obtained from service provider information already stored on the smart device. Meanwhile, geographic information could be specified to the system in the QR code itself, could be derived from an IP or mac address associated with a device accessing a cloud server, could be obtained using geo-location services associated with the smart device 110, could be required to be manually indicated by the user, and the like.

In some instances, the QR code may itself specify the command(s) and protocol/command code set, if needed, for use in programming the programmable media access key 106. For example, if the token 300 is provided to the user directly by the service provider, the service provider can program the QR code with the information needed to select the appropriate command(s), and protocol as needed, to access a media content provider (or a media stream originating from a media content provider) via use of the hardware that is provided to the user by the service provider. For example, the QR code can specify to the system that, for the "ESPN" media content service, the system is to use commands for tuning to channel 270 and to use the protocol appropriate for the STB that the service provider knows was given to the user during their service provider system install.

Figure 3D:
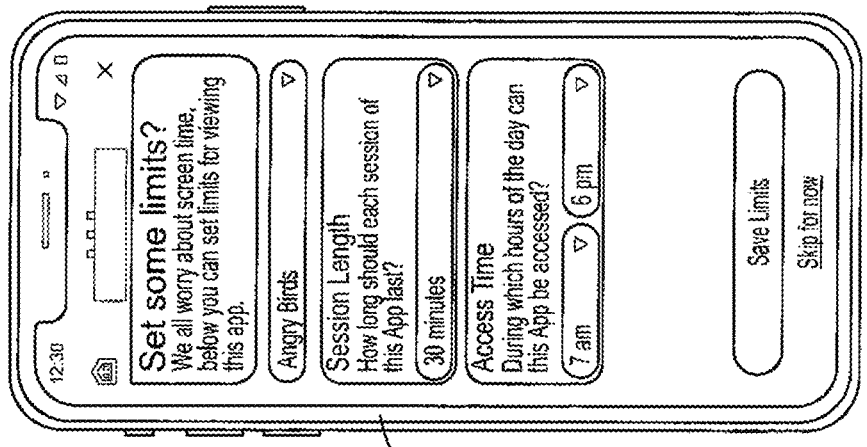
Figure 3C:
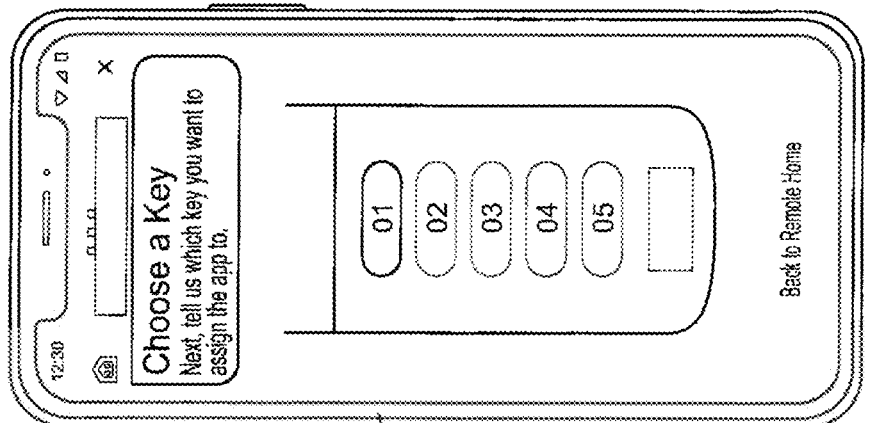

To select the media access key 106 that is to programmed via use of the data obtained from or derived from the QR code 302, the user may indicate to the configuration app, either before or after scanning the QR code 302 with the camera, the specific one of the media access keys 106 to which the one or more commands are to be assigned as shown in FIG. 3C. In the example illustrated, the user is presented with an image that is representative of the remote control 100 and the user may simply tap the media access key 106 to indicate to the configuration app that exact key 106 that the user desires to program. As will be appreciated, additional means for indicating to the configuration app the specific media access key 106 that is to be programed are contemplated.

Once the user has scanned the QR code and indicated the media access key 106 that is to be configured, the configuration app, either alone or in connection with a cloud-based service, will determine, as discussed above, the one or more commands, and possibly protocol, that will need to be used by the remote control 100 to cause/instruct a controllable target device to access a media content provider. This required information may then be provided to the controlling device 100 by the smart device 110, directly or indirectly, and/or by the cloud-based service as desired. Upon receiving the information, the remote control 100 will be able to assign the determined one or more commands to the indicated media access key 106 using any technique that is conventional in the art. In this manner, when the media access key 106 is activated, the assigned one or more commands will be transmitted to a target controllable device using a protocol that is recognized by the target controllable device.

In addition to being used to access a media content provider, it will be appreciated by those of skill in the art that a programmable key 106 of the controlling device can be programmed with (or otherwise be mapped to) a deep-link such that activation of the programmable key 106 will cause a media streaming device to access a particular piece of streaming content within a particular content providing service (e.g., "Stranger Things" on "Netflix">Stranger Things). Similarly, the programmable key configuration data can cause a device to access a traditional service provider's offering (e.g., a particular channel, a video on demand offering, etc.), gaming, music, or any other apps on a smart device, such as a TV.

In some instances the configuration app can be further used to provide a parental control feature, e.g., to limit access time, to the media content provider as shown in FIG. 3D. To the end, the controlling device 100 will be provided with a real-time clock and/or a timer. A user may then set for a media content provider, e.g., the "ANGRY BIRDS" app, that has been associated with a programmable key 106 of the remote control 100 a cumulative time limit that specifies for how long each day a user can access the media content provider, e.g., for 30 minutes a day, and/or a range time limit that specifies the times of day during which the user can access the media content provider, e.g., between the hours of 7 am and 6 pm. This parental control, configuration information will be provided to the controlling device 100 as described above and will be stored in memory in association with the corresponding, programmed key 106.

When a user uses a programmed key 106 to which a parental control, range time limit has been mapped, the remote control 100 may determine the time of day versus the set usage times and, if the determined time of day falls outside of the set usage time range, the remote control 100 will inhibit the transmission of the one or more commands that will cause the target controllable device to access the media for which the usage time was set. The remote control may also be configured to send one or more commands as appropriate to terminate a session at the specified ending time (which may be preceded by a warning to the user to allow the user to save any information as needed). Similarly, when a user uses a programmed key 106 to which a usage time limit has been set, the controlling device 100 may start/restart a timer (or track the real-time) and when the timer (or tracked real-time) indicates that the cumulative length of time specified for accessing a media has been reached, the controlling device 100 may send one or more commands as appropriate to terminate the session (which may be preceded by a warning to the user to allow the user to save any information as needed) and thereafter prevent usage of the controlling device 100 to re-access the media until the next day.

Figure 5B:
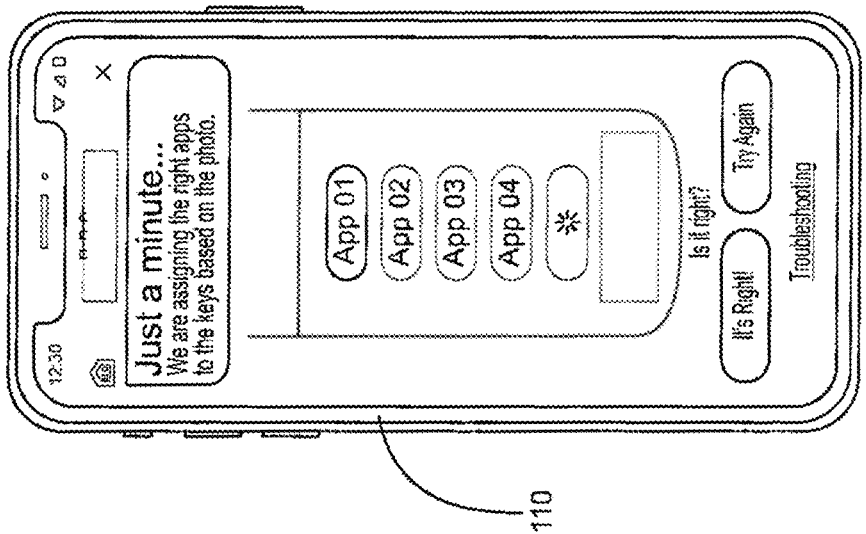
FIGS. 5A and 5B illustrates example steps for configuring a configurable key of the example controlling device with one or more commands for accessing a media content provider.
Figure 5A:
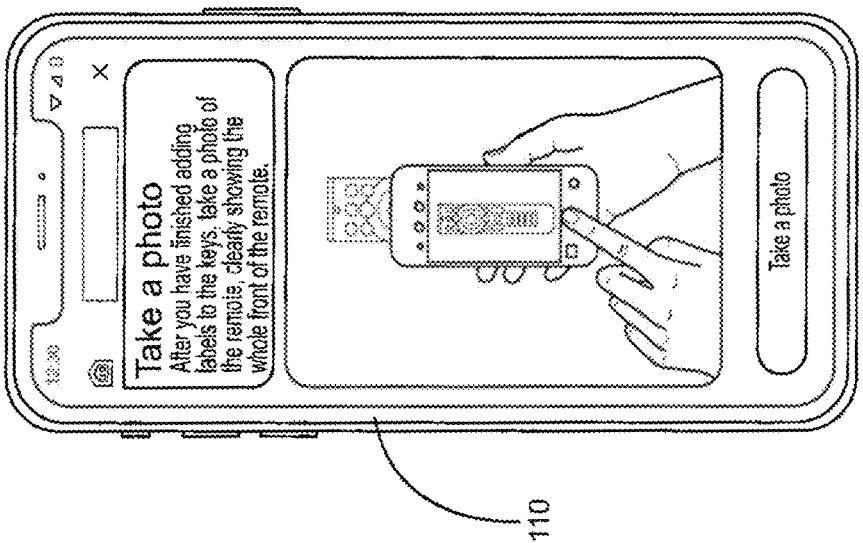

In another example, an image of one or more inserts 304 attached to one or more of the programmable keys 106 of the controlling device 100 is captured as shown in FIG. 5A. The configuration app, either alone or in cooperation with a cloud-based service, uses image processing techniques, which may include pattern matching, OCR, and the like, to identify from the indicium or indicia imprinted upon the inserts 304 the media content provider that is associated with each of the programmable keys 106. Once the media content provider to programmable key 106 mapping is discerned via use of the image processing techniques, the configuration app, either alone or in cooperation with the cloud-based service, will cause the controlling device 100 to be configured as discussed above.

In some instances, the configuration app may cause the controlling device 100 to be temporarily configured. In this manner, a user can test the configuration as shown in FIG. 5B and indicate to the configuration app whether the configuration was successful or unsuccessful. If successful, the configuration app can make the temporary configuration permanent (until the key is reconfigured) and if the configuration was unsuccessful, the temporary configuration can be removed, defaulted to a prior configuration, or the like as desired and the configuration process can be retried at the discretion of the user.

Figure 6:
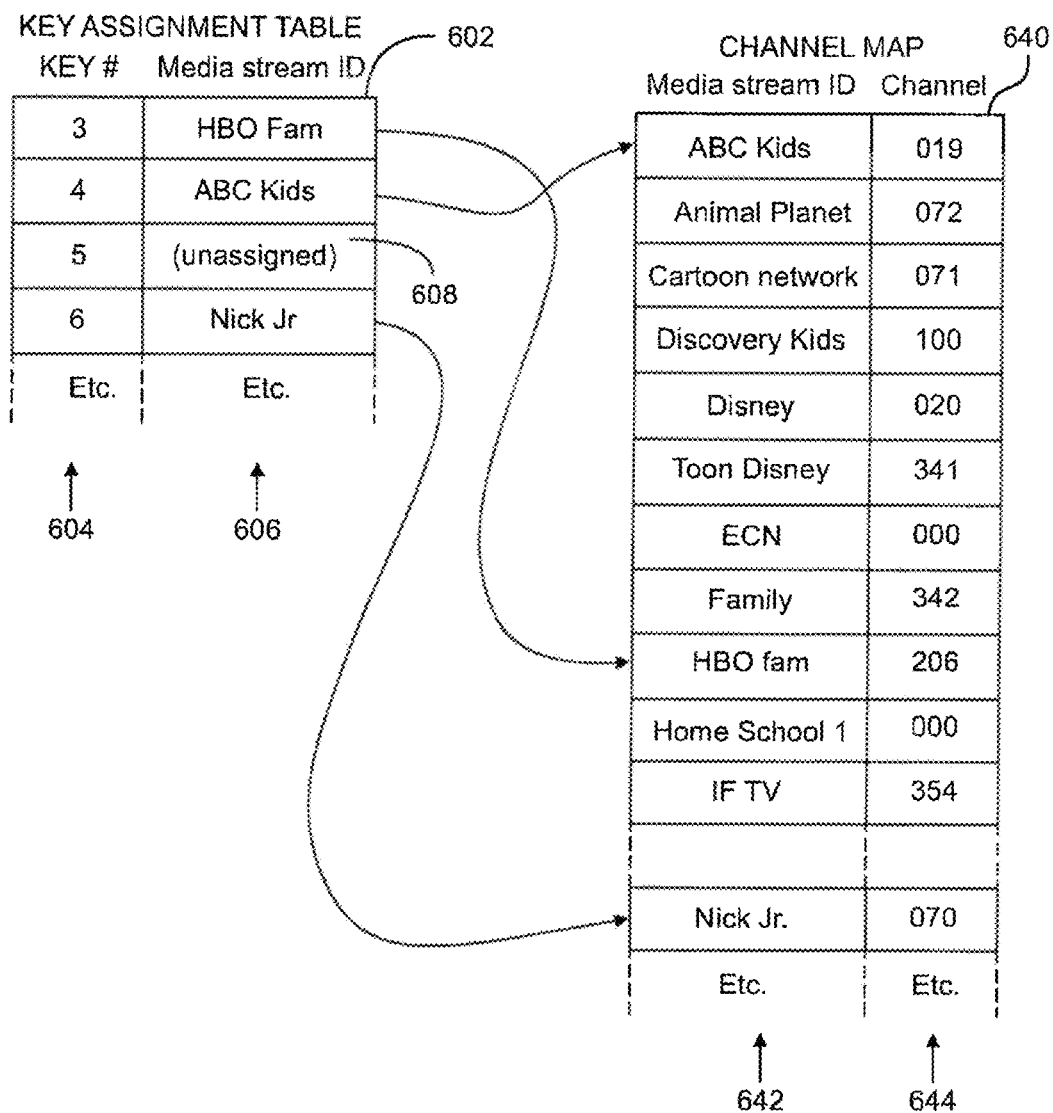
FIG. 6 illustrates an example method that uses memory tables in connection with the selection of media streams in response to key presses on the controlling device of FIG. 1.

Turning now to FIG. 6, there is illustrated a further method for controlling a controllable appliance to access a given media content provider. In this example, a key assignment table 602 and a channel map table 640 is stored in non-volatile memory e.g., 206, of the controlling device 100. Key assignment table 602 cross-references physical key locations 604 (corresponding to configurable keys 106) to the media content provider identities 606 (as determined via use of the configuration app and as provided to the controlling device 100) of the inserts 304 installed on those keys Channel map table 640 cross-references media providers 642 to channel numbers 644 or other data suitable for use in constructing appliance command sequences for selection of those providers. It will be appreciated that while the illustrative media content provider identity entries of tables 602 and 640 are presented in the form of descriptive text to facilitate readability, in practice these identities may comprise numbers, binary values, coded text, call signs, channel allocations, etc., as appropriate for a particular implementation. In this context, it will be also be appreciated that the channel map table 640 may vary depending upon one or more of a current location of a controlling device, e.g., its geographic situation, source of content, e.g., cable provider, satellite provider, etc., level of service subscribed to, etc. By way of example, location data that may be used in the creation of a channel map table such as 640 may include zip code, service provider (e.g., cable MSO, satellite system, etc.), and level of service (e.g., standard, HD, premium, etc.). Channel map 640 may be loaded into the memory 206 of controlling device 100 through for example input/output port 218, at time of manufacture, at time of shipment to a particular region or customer, by a dealer at point of sale, directly by a consumer either via manual data entry or interaction with a PC application and/or Internet Web site, etc. as appropriate. A channel map table may be configured by the entry of data such as zip code, service provider, etc. into the configuration app which configuration app may then forward the entered data to an Internet based server which may construct a suitable channel map table and return this to configuration app for download into controlling device 100.

It will also be appreciated that a similar process to that described above used a channel map table may be utilized by the configuration app itself (alone or in combination with a cloud-based service) to determine the one or more commands to be provided to the controlling device 100.

If an unprogrammed key 106 is activated by a user an error condition may be indicated to the user, for example by flashing an LED, beeping, etc. and no command will be transmitted. Alternatively, a default media content provider selection or other action to be performed by unassigned selection keys may be established, either as part of channel map table 640, by the configuration app, or the like. By way of example only, such a default may result in the display of a program guide, may result in display of instructional material regarding how to configure remote control 100, may result in selection of a service provider's "home" page, etc.

It is also contemplated that a media streaming device can be configured to provide configuration data to a remote control for use in programming the key 106. In such a system, a user interface of a smart device, e.g. the TV or STB, can provide a mechanism for a user to navigate to an select a desired media that is to be associated with the key 106, e.g., a streaming service, a content offered by a streaming service, a game, etc. as described above. For example, a user can use the user interface to navigate to the desired media and the user can then activate the key 106 to be programmed for a predetermined amount of time (e.g., 5 seconds). Upon the key 106 being activated for the predetermined amount of time, the controlling device will send to the smart device a request for the configuration data that is associated with, i.e., will allow future access to, the media that is currently selected. In this manner, the target device will send the configuration data to the controlling device and the controlling device will program the key 106 on that remote.

When the key matrix 216 includes one or more display elements 700, a controlling device 100' can be dynamically configured to command a target device to access one or more services. The dynamic configuration can be based on, for example, the service access history of one or more users, recommendations from a service provider, or the like. A display element 700 may be directly associated with a hard key 106 (i.e., included as a part of or positioned adjacent to) or the display element 700 may be used to provide one or more soft keys.

Figure 7A:
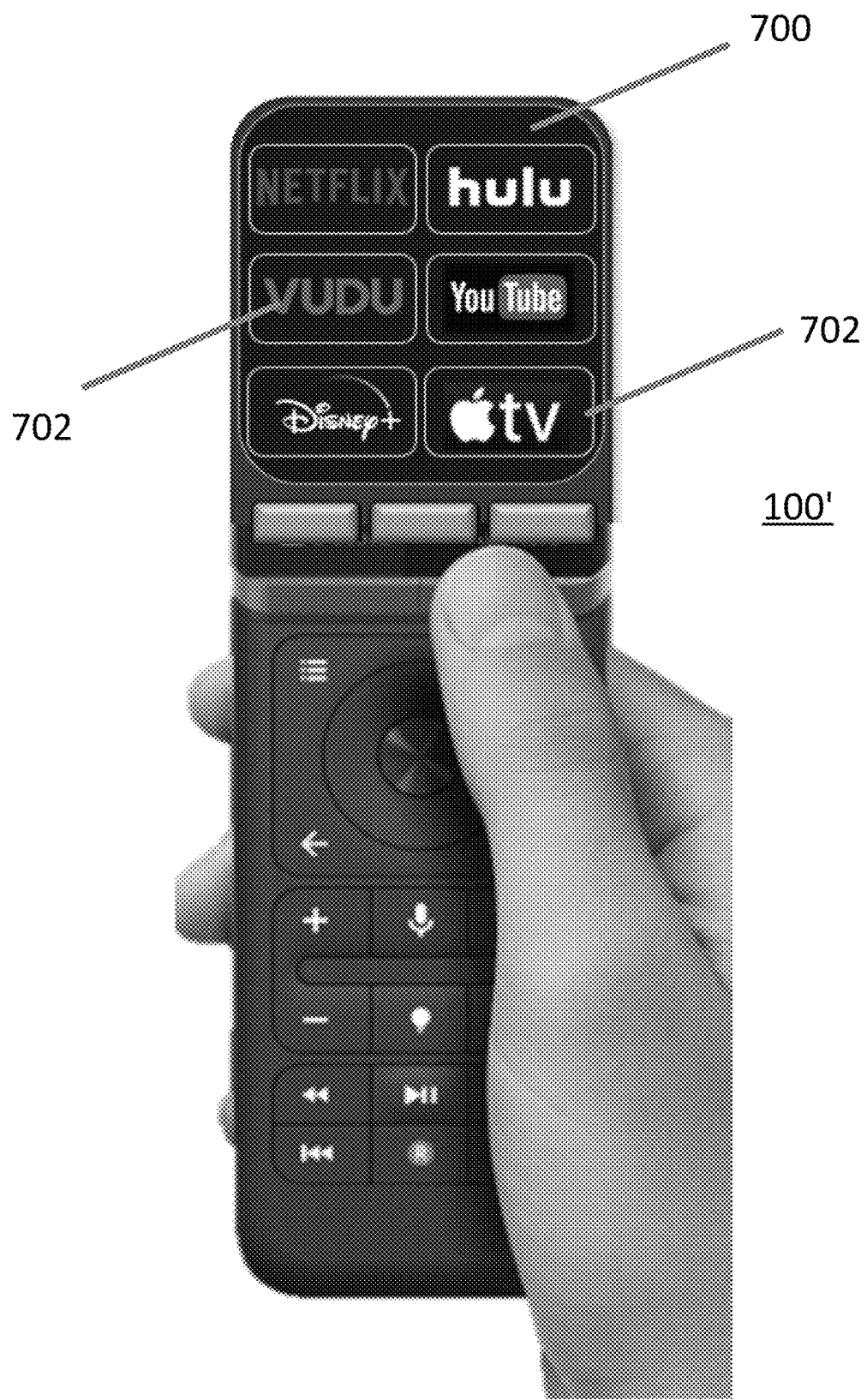
FIGS. 7A-7C illustrate example use cases for a screen-based remote control having one or more programmable input elements.

In one example, the interactions with one or more users with the controlling device 100' and/or a device, such as a STB, controllable via use of the controlling device 100' can be monitored. The system can then use the data collected, for example, the service access history of one or more users, to identify favorite channels, favorite apps, or the like (favorite services). The system can then function to dynamically configure the controlling device 100' such that activation of a programmable key of the key matrix 216, whether a hard key or a soft key, will cause the controlling device to issue one or more commands to a target controllable device within the ecosystem to cause the target controllable device to access the favorite service. In addition, the system can provide data to the controlling device 100' to dynamically configure the display that is associated with the programable key to display an indicator of the favorite service, whether a logo, words, etc. By way of example, FIG. 7A illustrates a controlling device 100' having a touch screen display 700 displaying plural soft keys 702 each of which is provided with a label that identifies a service, e.g., "HULU' or "NETFLIX", that will be commanded to be accessed by a target device, such as a media streamer, when the corresponding soft key 702 is activated.

In some instances, the system can additionally use the data collected to discern one or more times of day, week, and/or month at which a favorite service is accessed. The system can then configure the controlling device 100' such that activation of a programmable key of the key matrix 216, whether a hard key or a soft key, during a first time interval, such as between 8 μm and 8 am will cause the controlling device to issue one or more commands to a target controllable device within the ecosystem to cause the target controllable device to access a first favorite service and activation of the same programmable key of the key matrix 216 during a second time interval, such as between 8 am and 8 pm will cause the controlling device to issue one or more commands to a target controllable device within the ecosystem to cause the target controllable device to access a second favorite service.

The monitoring described above can be passive and/or conducted as instructed by one or more users. The use of the data obtained by monitoring to identify a service as a candidate for assigning to a programmable key of the remote control 100' can occur at predetermined time intervals, upon a predetermined number of service accesses via use of one or more device, etc. without limitation. In this manner, the service associated with a particular programmable key can be dynamically changed. In addition, a user may be provided with an indication that the controlling device 100' is to be dynamically configured with the user then given the option to accept or decline such configuration, e.g., to keep a prior service to key assignment. Still further, a user may be provided with the opportunity to turn on or off such service to key assignment suggestions. The indication can specify to the user, via use of the display, the service that will be made accessible via activation of the programmable key should the configuration be accepted, may provide the user with an indication of the programmable key to which the service is to be assigned, provide the user with an option to change to programmable key to which a service is to be assigned, etc.

Figure 7B:

It will also be appreciated that the collected data can be used to configure the controlling device 100' with commands and protocol as needed such that activation of a programmable key will access a service that is being promoted by a service provider. While it is anticipated that the promoted service will be based on past usage histories of one or more users, the promoted service need not be picked based on the collected data but can be simply based on a desire of a service provider to draw the attention of a user to a particular service. In addition, the configuration of the controlling device 100' to access a promoted service can be limited in time, i.e., made temporary, as desired. By way of example, FIG. 7B illustrates a controlling device 100' having a touch screen display 700 displaying a service recommendation 706. In this example, a user can indicate a desire, for example by activating key 708, to have the system configure the controlling device 100' whereby activation of a programmable key of the controlling device, whether a hard key or soft key, will command a target device to access a service, e.g., "Apple TV."

Figure 7C:

In addition to allowing a service provider, such as a Multichannel Video Programming Distributor, a device manufacture, or the like, to make recommendations of content or services based upon promotions or end customer insights, an end customer can interact with the system, either directly or via a remote website, to identify one or more services that the end customer would like to assign to a respective one or more programmable keys. As described, the system can then provide the remote control 100' with the instructions and data that will allow the remote control 100' to configure itself such that the remote control 100' will transmit one or more commands to one or more intended devices using a protocol appropriate for each of the one or more intended devices to thereby access the user specified service in response to an activation of a programmable input element. It is also contemplated that a user or the system can program the remote control 100' to display a reminder 710 or a promotion that a given show is available for viewing as shown in FIG. 7C. In this example, a programmable key can be temporarily configured to issue commands as appropriate to cause a target device to access the programming. The configuration and display of information about the programming may further be terminated when the programming is no longer available, for example when a live sporting event has ended.

It is also contemplated that a controlling device can be adapted using the teachings set forth above to provide control of/access to service associated with non-entertainment devices such as AC units, Video Doorbells etc., for example, to provide a remote control unit with one or more short cut keys that could be assigned for accessing such services.

While various concepts have been described in detail, it will be appreciated by those skilled in the art that various modifications and alternatives to those concepts could be developed in light of the overall teachings of the disclosure. For example, example embodiments are illustrated in the context of broadcast television content or app selection. However, it will be appreciated that controlling devices intended for use with other sources of media content, for example satellite radio, CD or DVD playback, video-on-demand services, Internet radio, etc., may equally benefit from the methods described herein.

Still further, while the systems and methods have been described in the context of functional modules, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for configuring a programmable key of a remote control, comprising:

using a service access history associated with at least a one of the remote control and a controllable appliance to determine a first service accessible via use of the controllable appliance that is to be associated with the programmable key; and transmitting to the remote control data for use by the remote control in configuring the remote control such that activation of the programmable key will cause the remote control to transmit a command to the controllable appliance to cause the controllable appliance to access the first service and for causing a display of an indicator for the first service in a display of the controlling device that is associated with the programmable key.

2. The method as recited in claim 1, further comprising subsequently using the service access history associated with at least the one of the remote control and the controllable appliance to determine a second service accessible via use of the controllable appliance that is to be associated with the programmable key and transmitting to the remote control data for use by the remote control in configuring the remote control such that activation of the programmable key will cause the remote control to transmit a command to the controllable appliance to cause the controllable appliance to access the second service and to cause a display of an indicator for the second service in the display of the controlling device that is associated with the programmable key.

3. The method as recited in claim 1, further comprising automatically using by the remote control the data to configure the remote control such that activation of the programmable key will cause the remote control to transmit the command to the controllable appliance to cause the controllable appliance to access the first service and to cause the display of the indicator for the first service in the display of the controlling device that is associated with the programmable key.

4. The method as recited in claim 1, further comprising requiring a user confirmation before using by the remote control the data to configure the remote control such that activation of the programmable key will cause the remote control to transmit the command to the controllable appliance to cause the controllable appliance to access the first service and to cause the display of the indicator for the first service in the display of the controlling device that is associated with the programmable key.

5. The method as recited in claim 1, wherein the programmable key comprises a soft key presented in the display.

6. The method as recited in claim 1, wherein the programmable key comprises a hard key positioned adjacent to the display.

7. The method as recited in claim 2, further comprising awaiting a predetermined amount of time between using the service access history and subsequently using the service access history.

8. The method as recited in claim 2, further comprising awaiting a predetermined number of service accesses between using the service access history and subsequently using the service access history.

9. The method as recited in claim 1, further comprising receiving input to cause the remote control to use the data to configure the remote control such that activation of a different programmable key will cause the remote control to transmit the command to the controllable appliance to cause the controllable appliance to access the first service and to cause the display of the indicator for the first service in the display of the controlling device that is associated with the programmable key.

10. The method as recited in claim 3, wherein the remote control is temporarily configured such that activation of the programmable key will cause the remote control to transmit the command to the controllable appliance to cause the controllable appliance to access the first service and is temporarily caused to display the indicator for the first service in the display of the controlling device that is associated with the programmable key.

11. The method as recited in claim 10, wherein the remote control is configured such that activation of the programmable key will cause the remote control to transmit the command to the controllable appliance to cause the controllable appliance to access the first service and is caused to display the indicator for the first service in the display of the controlling device that is associated with the programmable key for only so long as the service is accessible from a service provider associated with the controllable appliance.

12. The method as recited in claim 1, wherein the controllable device comprises a smart device having media streaming capabilities and the service comprises an app installable on the smart device.

13. The method as recited in claim 1, wherein the controllable device comprises a set-top box and the service comprises a channel accessible via use of the set-top box.

* * * * *